United States Patent [19]

Butler

[11] 4,042,984
[45] Aug. 23, 1977

[54] AUTOMATIC BATHTUB WATER LEVEL CONTROL SYSTEM

[75] Inventor: James L. Butler, Westlake Village, Calif.

[73] Assignee: American Bath and Shower Corporation, Los Angeles, Calif.

[21] Appl. No.: 645,569

[22] Filed: Dec. 31, 1975

[51] Int. Cl.² .......................................... E03C 1/242
[52] U.S. Cl. ............................................. 4/200; 4/1; 4/DIG. 3; 137/624.11
[58] Field of Search ................. 4/100, 1, 172, 17, 173, 4/200, 192, 166, 191, DIG. 3; 137/624.11, 624.12; 141/198; 222/70

[56] References Cited

U.S. PATENT DOCUMENTS

| | | | |
|---|---|---|---|
| 1,820,981 | 9/1931 | LeFever | 4/100 |
| 1,857,627 | 5/1932 | Elder | 222/20 |
| 2,180,790 | 11/1939 | Brummett | 4/192 |
| 2,813,274 | 11/1957 | Lewis et al. | 4/DIG. 3 |
| 2,877,467 | 3/1959 | Cloud | 137/624.11 |
| 2,906,301 | 9/1959 | Mannon | 222/70 |
| 2,908,017 | 10/1959 | Whaley | 4/1 |
| 2,926,360 | 3/1960 | Erickson et al. | 4/173 |
| 2,995,143 | 8/1961 | Strathearn et al. | 137/624.11 |
| 3,193,846 | 7/1965 | Lefebvre | 4/100 |
| 3,507,420 | 4/1970 | Nelson et al. | 222/20 |
| 3,541,614 | 11/1970 | Zorn | 4/100 |
| 3,693,197 | 9/1972 | Christiansen | 4/203 |
| 3,771,333 | 11/1973 | Jurjans | 222/70 |
| 3,809,116 | 5/1974 | Sanner | 4/172.17 |
| 3,908,204 | 9/1975 | Hopkins | 4/100 |

Primary Examiner—Richard E. Aegerter
Assistant Examiner—John W. Shepperd
Attorney, Agent, or Firm—Keith D. Beecher

[57] ABSTRACT

An automatic water level control system for a bathtub is provided whereby the user merely sets a manual control to a desired water level. The control system then sequentially closes the bathtub drain and turns on the water faucet. The water faucet is preferably of the temperature mixing type which has previously been pre-set by the user, so that water at a desired temperature flows into the tub. When a selected, pre-set level has been reached, the water is automatically turned off and the bath is ready. The control system uses solenoid controlled valves connected to the usual manually controlled valves in such a manner that the normal manual control of the bath water is not interfered with in any way when the automatic control system is not activated.

9 Claims, 10 Drawing Figures

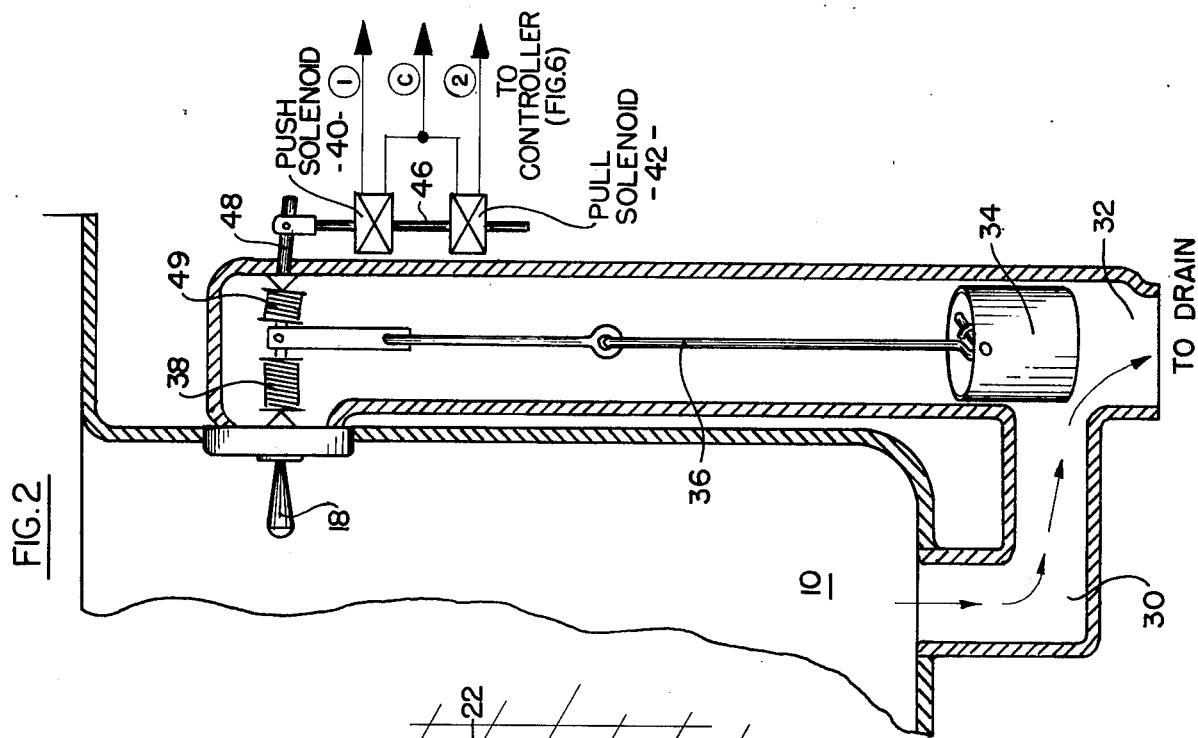
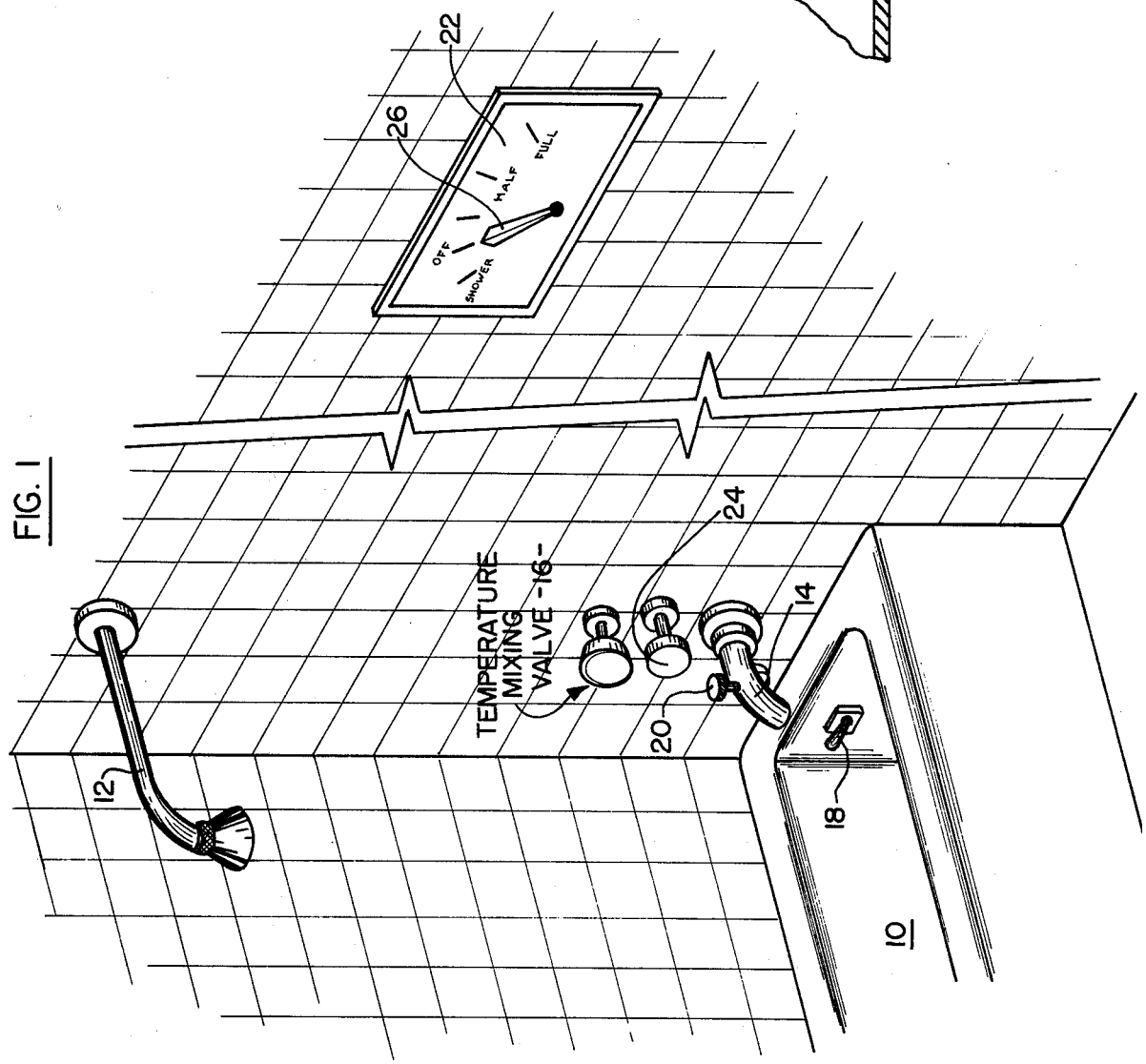

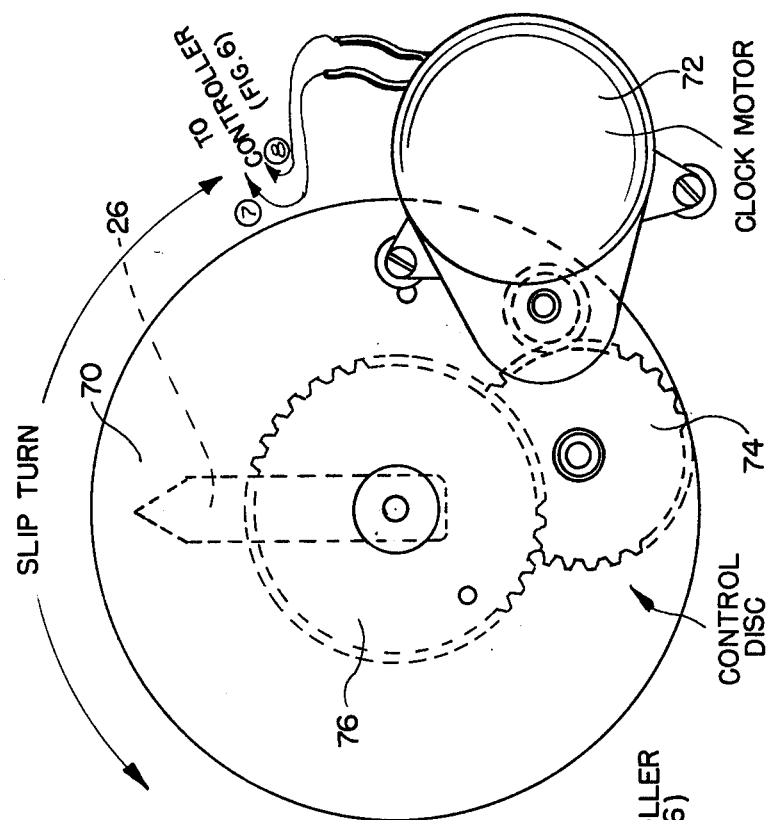
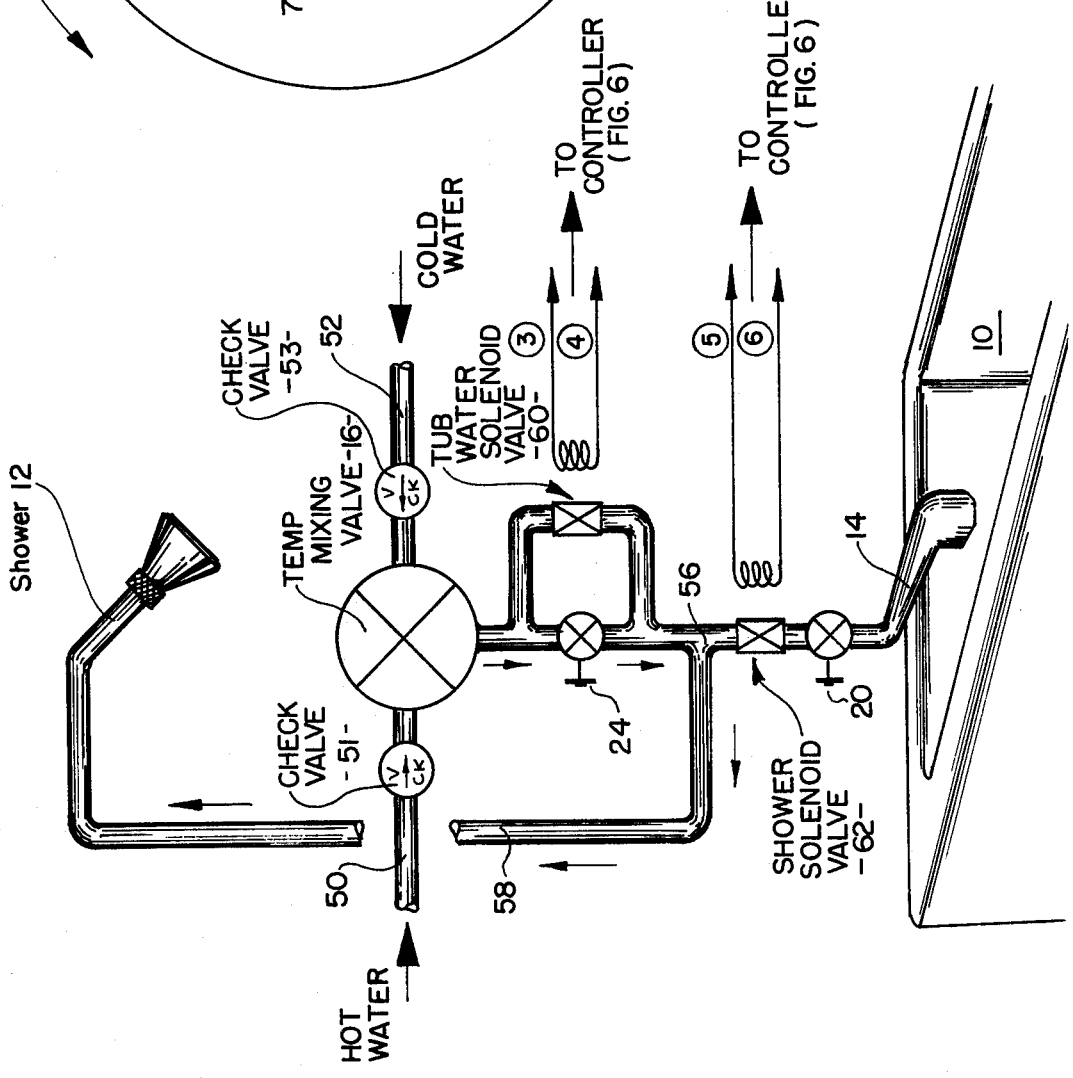

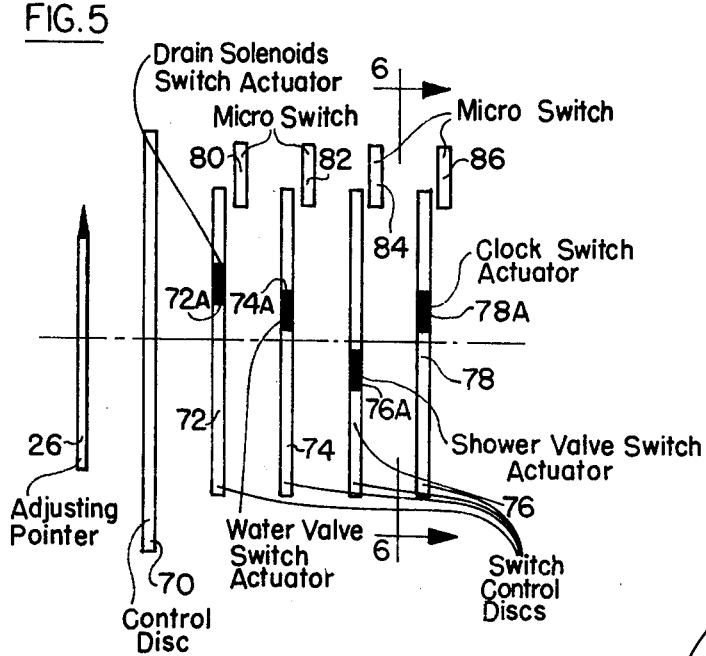
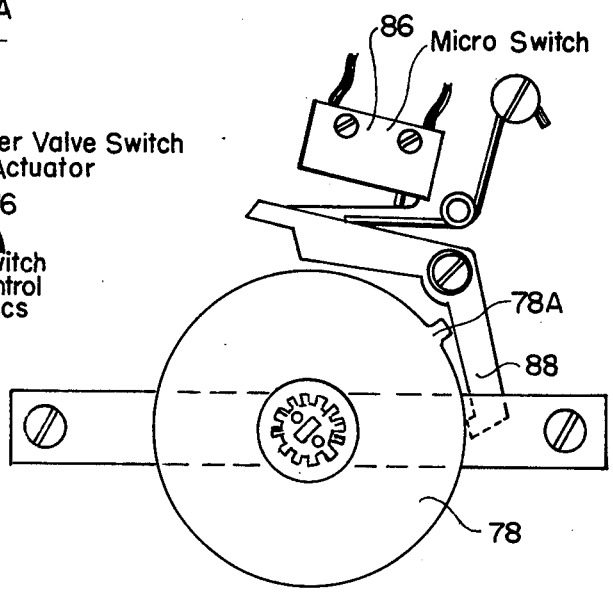
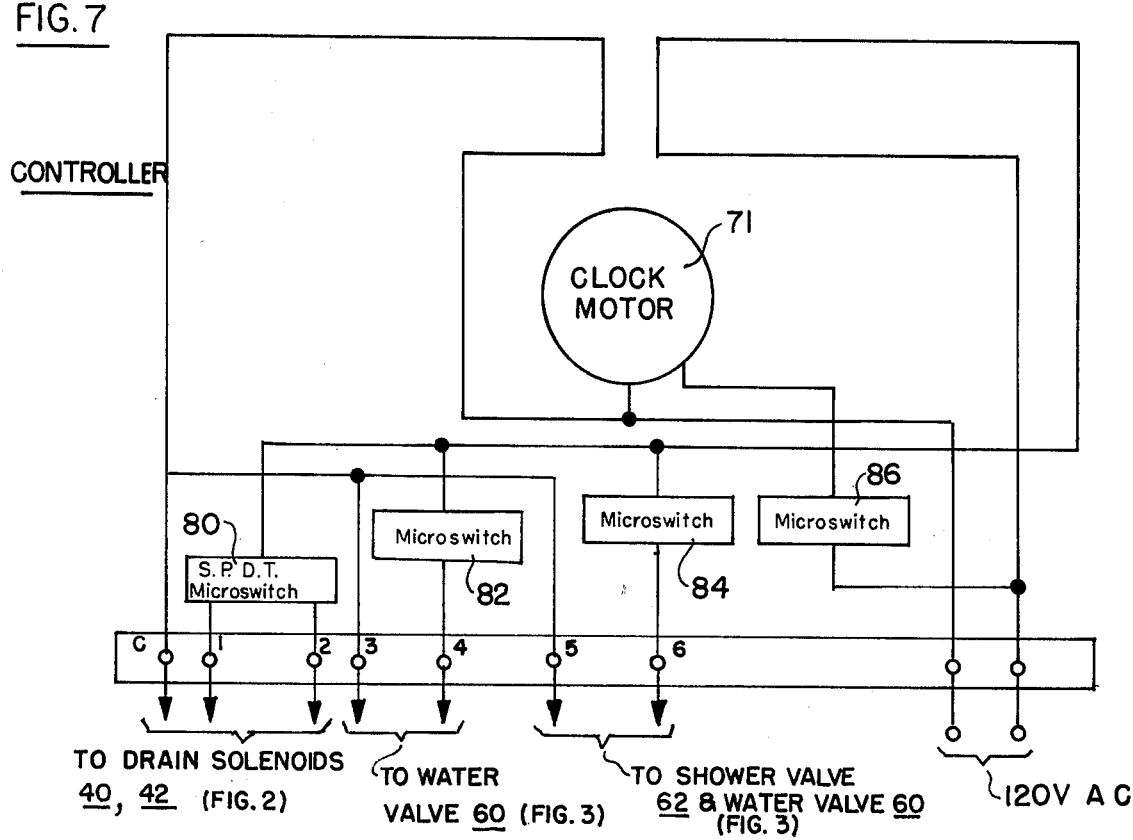

AUTOMATIC BATHTUB WATER LEVEL CONTROL SYSTEM

BACKGROUND OF THE INVENTION

Mechanical automatic water controls for bathtubs are known, one such control system being described, for example, in Brummett U.S. Pat. No. 2,180,790. The Brummett control system involves a separate water level sensing tank and a rather complex set of mechanical controls. The main objective of the present invention is to provide an improved bathtub level control system using electrical or solid state electronic controls for the drain and faucet, so as to provide a relatively simple and easy to install control system, one which is practical and feasible from a cost standpoint, and one that in no way interferes with the manual operation of the bathtub water controls unless the automatic control system is activated.

BRIEF DESCRIPTION OF THE DRAWINGS

FIG. 1 is a perspective representation of a bathtub equipped with the automatic control system of a first embodiment of the invention;

FIG. 2 is a sectional, somewhat schematic representation of a solenoid control for the drain plug mechanism of the bathtub of FIG. 1;

FIG. 3 is a schematic representation of a solenoid control for the bath and shower water faucets of the bathtub of FIG. 1;

FIG. 4 is a schematic representation of a portion of the controller of the system of the first embodiment; including an electric clock motor and a control disc;

FIG. 5 is a schematic representation of the various components of the control disc of the controller;

FIG. 6 is a view of one section of the control disc of the controller, taken essentially along the line 6—6 of FIG. 5;

FIG. 7 is an electrical representation of the controller;

DETAILED DESCRIPTION OF THE ILLUSTRATED EMBODIMENTS

Figure 9:
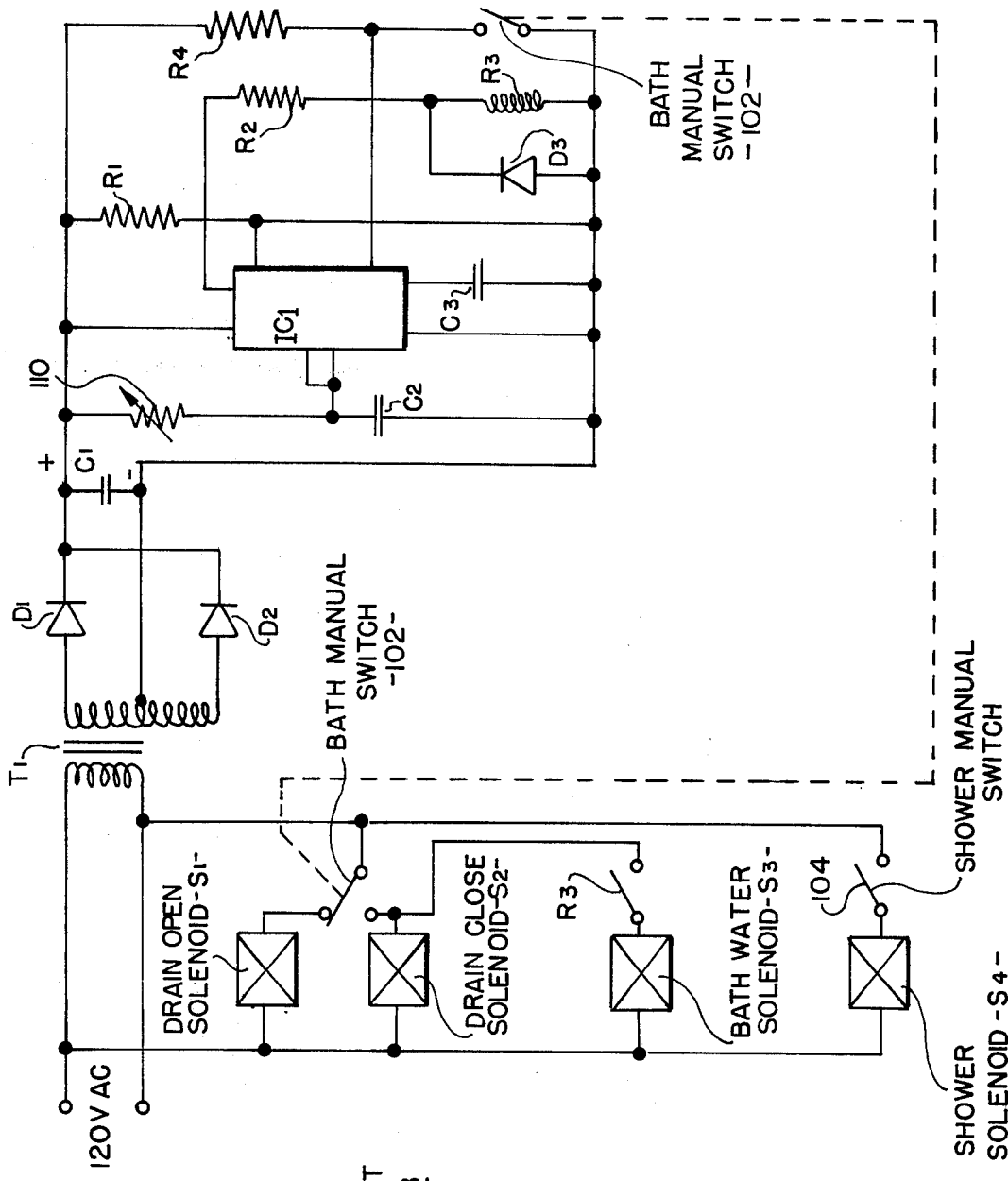
FIG. 9 is a circuit diagram of the solid state embodiment using a timer control.

The representation of FIG. 1 includes a bathtub 10, and a usual shower 12. The inlet faucet for the bathtub is designated 14, and it is controlled by a usual temperature mixing valve 16 and manually operated valve 24. The drain is controlled by the conventional pivotally mounted drain control lever 18. A shower valve 20 is provided in the faucet 14.

To draw bath water into the bathtub, the conventional temperature mixing valve 16 is turned to a desired water temperature, and valve 24 is turned manually to control the flow of water into the bathtub through the faucet 14. The lever 18 is set to close the drain, so that the bathtub may be filled. When a shower is desired, the valve 20 is pulled up, and the drain control lever 18 is set to the open position. All of these valves may be operated in a normal manner when the automatic control system is de-activated, if manual control is desired.

The automatic control system of the present invention in the first embodiment includes a control panel 22 which is mounted on the wall, preferably in a remote location from the bathtub, as shown. A pointer 26 on the control panel 22 is turned clockwise from the "off" position, as illustrated, when the control is to be initiated, to a selected calibration corresponding to the depth of water required in the bath tub. When that operation has been carried out, the automatic control system of the invention causes the drain plug to close, and water to flow into the bathtub until the selected level has been reached. As water flows into the bathtub, pointer 26 is turned counterclockwise by a timer back towards the off calibration. When it reaches the calibration adjacent the off calibration, the timer and bath water are both turned off. The bath is now ready. If desired, an appropriate buzzer, or other signal may be provided which is activated when the bath is ready.

When the bath has been completed, the pointer 26 is turned manually back to the off position, and this causes the control system to open the plug and drain the bathtub. If a shower is desired, the pointer 26 is manually turned counterclockwise to the shower calibration. Then, at the end of the shower, it is manually turned back to the off position.

The control mechanism for the drain plug is shown in FIG. 2. As illustrated, the bathtub includes a drain pipe 30 which is coupled to the main drain pipe 32. A plug 34 is suspended by means of a rod 36 to the inner end of the pivotally mounted lever 18. An over-center spring 38 is provided, so that the manually-operated lever 18 may be turned down to pull the plug 34 up to a "drain open" position, or the lever 18 may be turned up to cause the plug 34 to move downwardly and close the drain.

The first embodiment of the control system of the present invention includes a push solenoid 40 and a pull solenoid 42, both of which control a rod 46. The upper end of the rod 46 is pivotally mounted to a lever 48 which, in turn, is coupled to the upper end of rod 36 through an over-center spring 49. These solenoids do not interfere with the normal manual operation of the drain plug lever 18.

Push solenoids and pull solenoids are known to the art. When the push solenoid 40 is energized, it causes rod 46 to move upwardly thereby to close the drain. On the other hand, when the pull solenoid 42 is energized, it causes the rod 46 to move downwardly, thereby to open the drain. However, at all times the drain plug may be operated manually by lever 18, independently of the automatic control, whenever desired.

As shown in FIG. 3, hot water and cold water for the bathtub are supplied through respective pipes 50 and 52 and through respective check valves 51, 53 to temperature mixing valve 16. The outlet from valve 16 is coupled to the faucet 14 through a pipeline 56. The manual valve 24 is mounted in the pipeline 56, as is the manual shower valve 20. These valves provide for manual control of the bath water, independently of the automatic control, whenever desired. The shower pipeline 58 is coupled to the pipeline 56 between the two valves, as shown. A bath water solenoid valve 60 is mounted in parallel with valve 24, and a shower water solenoid valve 62 is mounted in series with the shower valve 20. This is an important feature of the invention since it permits normal manual operation of the bath water, merely by turning on valve 24 without any interference from the automatic controls. Likewise, manual operation of the shower is carried out merely by closing valve 20.

For manual control of the bath water, the temperature mixing valve 16 is set and the valve 20 is opened.

Valve 24 is normally open to introduce bath water into the bathtub. When the valve 20 is closed, the shower is operated.

When automatic control is desired, the temperature mixing valve 16 is set, but valve 24 remains closed and valve 20 is in its normally open state. Then, when the pointer 26 is manually moved clockwise away from the off position on the control panel 22, the controller first operates the push solenoid 40 of FIG. 2 to close the drain, and it then operates the solenoid valve 60 to cause bath water to flow into the bathtub. When the desired water level has been reached, the controller causes the solenoid valve 60 to close.

When the pointer 26 is set to the shower position on the control panel 22, both the valves 60 and 62 are operated to close the valve 62 and open the valve 60, so that the shower water continues so long as the pointer is placed to the shower position.

As shown in FIG. 4, the pointer 26 is coupled to a control disc 70, and when the pointer 26 is turned, the control disc also turns through a slip clutch arrangement. When the pointer 26 is turned from the off position in a clockwise direction, a clock motor 71 is energized. The clock motor is mechanically coupled to the control disc through an idler gear 74 and through a gear 76, the latter gear being attached to the disc in coaxial relationship therewith. The clock motor 72 proceeds at a timed rate to turn the disc 70 in a counterclockwise direction back to an angular position at which the pointer 26 is aligned with the calibration on the control panel 22 just to the right of the off position. When the control disc has been returned to that particular angular position, the clock motor is de-energized, and the bath water valve 60 is closed. The bath is now ready. At the end of the bath, the user merely turns the pointer back to the off position, which causes the pull solenoid 42 to be energized, so that the bath water may be drained through the drain. If desired, the control may be such that the drain is opened manually, in which event the clock motor returns the pointer to the off position.

As shown in FIG. 5, the control disc 70 is mechanically coupled to a plurality of switch control discs 72, 74, 76 and 78 in coaxial stacked relationship with it, and which turn with the control disc 70, and which collectively with pointer 26 constitute a manually settable control member. Each of the switch control discs has a tooth, such as the teeth 72a, 74a 76a and 78a at a selected angular position, and the teeth of the switch control discs operate associated microswitches 80, 82, 84 and 86. The actual operation of each microswitch may be through a springloaded crank arm 88, as best shown in FIG. 6.

The connections of the various microswitches are shown in the circuit diagram of FIG. 7. The microswitch 86 controls the clock motor 71. The microswitch 86 is operated when the control disc is turned from the off position, and the tooth 78a is positioned, so that it is again operated when the timer returns the control disc and pointer 26 to the calibration to the right of off on the control panel 22, or to the off position if the drain is opened manually. The clock motor is then de-energized and the control disc is stopped.

The switch 80 is a single-pole double-throw toggle type which, when first operated by the turning of the controller 70 by the pointer 26 energizes the push solenoid 48 of FIG. 2 to close the drain. The switch 80 may be of the momentary contact type, and the solenoids 40 and 42 may be of the pulse operated type to obviate continuous current flow through the solenoids for either operating condition.

The microswitch 82 is connected to the water solenoid valve 60 of FIG. 3, and it also may be of the momentary contact type. The microswitch 82 is first operated to energize the solenoid 60, when the control disc 70 is turned by the pointer 26 in a clockwise direction to a desired calibration on the control panel 22. The microswitch 82 is again operated to turn off the valve 60 when the timer returns the controller and pointer 26 to the calibration to the right of the off position on the control panel 22 of FIG. 1.

At the end of the bath, when the user turns the pointer to the off position, the switch 80 is again operated to activate the pull solenoid 46 so as to open the drain.

When the pointer 26 is turned counterclockwise to the shower position, the microswitch 84 is activated to energize the shower valve 62 and water valve 60 for showering purposes. This energization continues until the pointer 26 is turned back to the off position.

Figure 8:
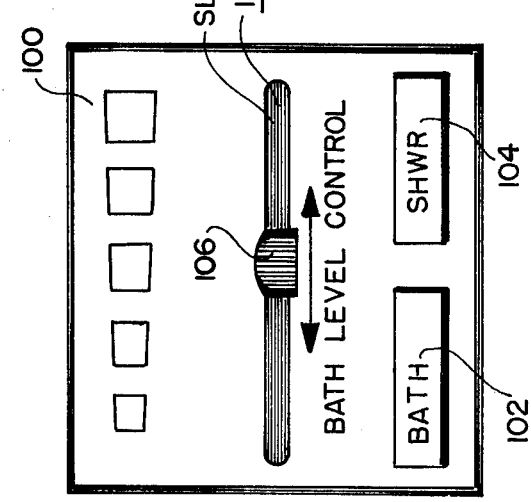
FIG. 8 is a representation of the control panel of a second, solid state embodiment of the invention.
Figure 10:
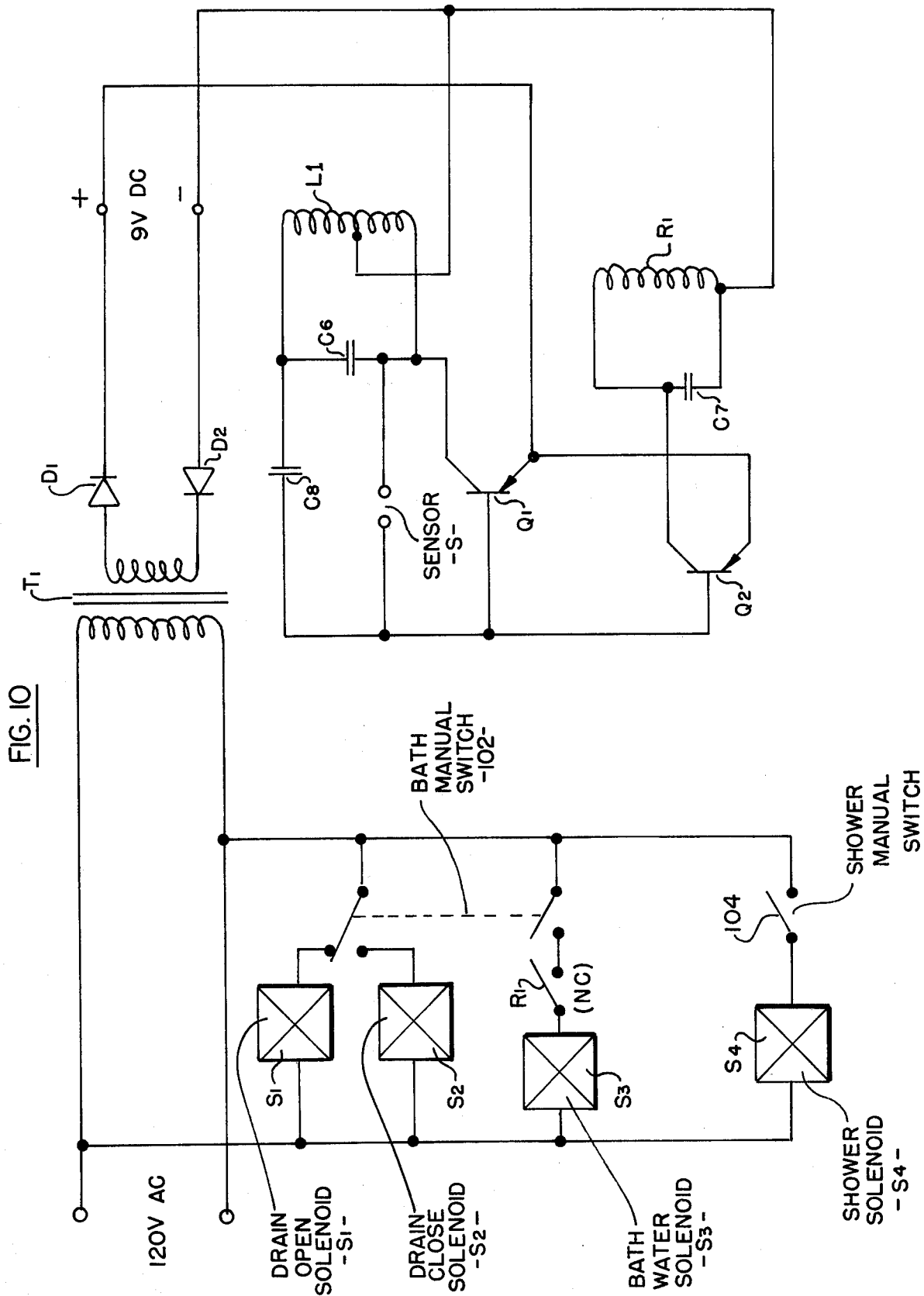
FIG. 10 is a circuit diagram of the solid state embodiment using a level sensor control.

The solid state embodiment of the invention, as shown in FIGS. 8-10 includes, for example, a control panel 100 which may replace the control panel 22 of the embodiment shown in FIG. 1. A pair of switches 102 and 104 are mounted on the control panel 100, and these may be the usual illuminated type manually operated switches. A control 106 is also mounted on the control panel, and may be moved manually back and forth in a slot 108 to set the desired level of water in the bathtub.

In the operation of the second embodiment, the control 106 is set to a desired water level, and the switch 102 is depressed for a bath. Then, the system operates to close the drain, to turn on the faucet so as to fill the bathtub to the selected level, and then to turn off the water. At the end of the bath, the switch 102 may be depressed a second time to open the drain. For a shower, it is merely necessary to depress the switch 104.

The control 106 controls a potentiometer 110 in the circuit of FIG. 9. The circuit is energized through a transformer T1 whose primary winding is connected to the usual 120-volt alternating current source. The secondary of the transformer T1 is connected through a pair of diodes D1 and D2 to a capacitor C1 which is shunted between one side of the secondary and the center tap. A direct voltage appears across the capacitor C1.

The potentiometer 110 is connected to an integrated circuit IC1, as are capacitors C2 and C3 and resistors R1 and R2. The resistor R2 is connected to a relay winding R3 which is shunted by a diode D3. One section of the manual switch 102 is connected to the integrated circuit IC1, as shown, and to a resistor R4. The circuitry of FIG. 9 acts as a timing circuit, and the current flow through the relay R3 is terminated at the end of a predetermined time interval following the closure of the switch 102, the interval being controlled by the setting of the potentiometer 110.

A plurality of solenoids S1, S2, S3 and S4 are connected to one side of the 120-volt alternating current source. The solenoids S1 and S2 are connected through another section of the bath manual switch 102 to the other side of the source, the second section of the switch 102 being a single-pole double-throw switch. The solenoid S3 is connected to one terminal of switch 102, as shown, and the solenoid S4 is connected through the shower manual switch 104 to the other side of the alternating current source. The solenoid S1 opens the drain in FIG. 2, and the solenoid S2 closes the drain.

The solenoid S3 turns on the water in the system of FIG. 3, and the solenoid S4 activates the shower. When the bath switch 102 is first operated, it activates the circuit of the integrated circuit IC1, and also energizes the solenoid S2 to close the drain. The relay R3 is energized and relay contacts R3 also close to energize the solenoid S3. After a predetermined time, depending on the setting of the potentiometer 110, the relay R3 is de-energized, so that the contact R3 opens to de-energize the solenoid S3 and turn off the bath water. At the end of the bath, the manual switch 102 is again activated to energize the drain open solenoid S1, so that the drain may be opened. The solenoid S3 remains de-energized during this latter operation, because of the opening of the single-pole double-throw section of switch 102, so that the bath water remains off.

The switch 104 may be a toggle-type, and when it is first operated it energizes the shower solenoid S4 to activate the shower. The shower remains activated until the switch 104 is again operated, at which time it de-energizes the solenoid S4 and turns off the shower.

In the circuit of FIG. 10, the secondary of transformer T1 supplies 9-volt DC current to the network of transistors Q1 and Q2. The collector of transistor Q1 is connected to one side of a coil L1, and the collector of transistor Q2 is connected to one side of a relay coil designated R1. A capacitor C6 is shunted across the coil L1, and a capacitor C7 is shunted across the relay R1. A further capacitor C8 is connected to one side of the coil L1 and to the emitters of the transistors Q1 and Q2. A depth sensor S is connected across the collector and base of the transistor Q1. The emitters of the transistors Q1 and Q2 are connected to the positive side of the 9-volt voltage source, and the lower side of the relay R1 is connected to the negative side.

The sensor S may be mounted in the bathtub, with its electrodes exposed to the water level. Then, when the water rises to the level of the sensor, it provides a connection across the electrodes of the sensor S causing current to flow through the relay coil R1, thereby to open the normally closed contact R1 connected to the bath water solenoid S3.

To operate the system, the bath switch 102 is first operated to move to its lower position thereby to energize the drain close solenoid S2 and the bath water solenoid S3. The bath water solenoid remains energized until the water level rises to the level of the sensor S, at which time the relay R1 is energized to open the contacts R1 and de-energize the bath water solenoid S3.

At the end of the bath, the manual switch 102 is returned to its upper position energizing the drain open solenoid S1 and causing the bathtub to empty.

The invention provides, therefore, a simple and improved bathtub control which automatically causes water to flow into the bathtub to a selected level.

While particular embodiments of the invention have been shown and described, modifications may be made. It is intended in the claims to cover the modifications which come within the spirit and scope of the invention.

What is claimed is:

1. In combination: a bathtub; a water inlet pipe for supplying water to the bathtub; a temperature mixing valve coupling the water inlet pipe to hot water and to cold water supply pipes; a solenoid-operated valve coupled to the water inlet pipe to control the flow of water into the bathtub; a manually-operated valve coupled to the water inlet pipe in parallel with the solenoid-operated valve to control the flow of water into the bathtub independently of the solenoid-operated valve; a drain plug for draining water out of the bathtub; a solenoid-operated control mechanism mechanically coupled to the drain plug to open and close the drain plug; a manually-operated mechanism coupled to the drain plug to open and close the drain plug independently of the solenoid-operated control mechanism; and an electric control circuit connected to said solenoid-operated valve and to said solenoid-operated drain plug control mechanism, said electric control circuit including first switching means electrically connected to an energizing source and to said solenoid-operated drain plug mechanism selectively to connect said solenoid-operated drain plug mechanism to said energizing source to cause said solenoid-operated drain plug mechanism selectively to open and close the drain plug as said first switching means is operated between a first and second operating position, a second switching means electrically connected to said solenoid-operated valve to cause said solenoid-operated valve selectively to close and open as said second switching means is selectively operated between a first and a second operating position, electric timing means, a third switching means electrically connected to said electric timing means selectively to de-energize and energize said electric timing means when said third switching means is selectively operated between a first and a second operating position, and a manually settable control member mechanically coupled to the first, second and third switching means and to the timing means and manually operable to set the first, second and third switching means to their second operating positions as said control member is manually moved to a selected setting and subsequently operated by said timing means to set the second and third switching means to their first operating position after a predetermined time interval established by the setting of said control member.

2. The combination defined in claim 1, in which said manually settable control member is settable to an off position at the end of a bath to set said first switching means to its first operating position and open the drain plug.

3. The combination defined in claim 1, and which includes a shower head, a shower inlet pipe coupling said water inlet pipe to said shower head, a second solenoid-operated valve included in said water inlet pipe for forcing water through said shower inlet pipe to said shower head, a second manually-operated valve included in said water inlet pipe in series with said second solenoid-operated valve for forcing water through said shower inlet pipe to said shower head, and said control circuit including a manually-operated fourth switching means electrically connected to said second solenoid-operated valve to cause said second solenoid-operated valve selectively to close and open as said fourth switching means is actuated between a first and a second operating position.

4. The combination defined in claim 1, in which said timing means includes an electrically energized clock, and in which said manually settable control member comprises a rotatable disc mechanically coupled to said clock to be rotated by said clock from a manually preset angular position, and in which said first, second and third switching means comprise respective switches actuated by said disc.

5. The combination defined in claim 1, in which said manually-operated mechanism coupled to said drain plug comprises a pivotally mounted manual control lever, and in which said solenoid-operated control mechanism coupled to the drain plug includes a push solenoid and a pull solenoid mechanically coupled to said control lever.

6. In combination: a bathtub; a water inlet pipe for supplying water to the bathtub; a temperature mixing valve coupling the water inlet pipe to hot water and to cold water supply pipes; a solenoid-operated valve coupled to the water inlet pipe to control the flow of water into the bathtub; a manually-operated valve coupled to the water inlet pipe in parallel with the solenoid-operated valve to control the flow of water into the bathtub independently of the solenoid-operated valve; a drain plug for draining water out of the bathtub; a solenoid-operated control mechanism mechanically coupled to the drain plug to open and close the drain plug; a manually-operated mechanism coupled to the drain plug to open and close the drain plug independently of the solenoid-operated control mechanism; and an electric control circuit connected to said solenoid-operated valve and to said solenoid-operated drain plug control mechanism, said electric control circuit including first manually-operated switching means electrically connected to an energizing source and to said solenoid-operated drain plug mechanism selectively to connect said solenoid-operated drain plug mechanism to said energizing source to cause said solenoid-operated drain plug mechanism selectively to open and close the drain plug as said first switching means is operated between a first and a second operating position, a second switching means electrically connected to said solenoid-operated valve to cause said solenoid-operated valve to close and open as said second switching means is operated between a first and a second operating position, electric timing means electrically connected to said first switching means to be energized when said first switching means is operated to its second operating position, and said timing means being connected to and controlling said second switching means for causing said second switching means to be actuated to its second operating position when said timing means is first energized to cause said solenoid-operated valve to open and for causing said second switching means to be actuated to its first operating position after a predetermined interval to cause said solenoid-operated valve to close, and a manually settable control element connected to said timing means to establish said predetermined time interval.

7. The combination defined in claim 6, in which said timing means comprises an electric timing circuit, said first switching means comprises a manually-operated pushbutton switch having a first section electrically connected to said solenoid-operated drain plug mechanism and having a second section electrically connected to said timing circuit to activate said timing circuit when said first switching means is operated from its first to its second operating position; and in which said timing circuit includes a relay for controlling said second switching means to move said second switching means to its second operating position when the timing circuit is activated, and to move said second switching means to its first operating position after a predetermined time interval determined by said timing circuit; and in which said manually settable control member comprises a potentiometer included in said timing circuit.

8. The combination defined in claim 6, and which includes a shower head, a shower inlet pipe coupling said water inlet pipe to said shower head, a second solenoid-operated valve included in said water inlet pipe for forcing water through said shower inlet pipe to said shower head, a second manually-operated valve included in said water inlet pipe in series with said second solenoid-operated valve for forcing water through said shower inlet pipe to said shower head, and said control circuit including a manually-operated third switching means electrically connected to said second solenoid-operated valve selectively to close and open as said third switching means is actuated between a first and a second operating position.

9. The combination defined in claim 6, in which said manually-operated mechanism coupled to said drain plug comprises a pivotally mounted manual control member, and in which said solenoid-operated control mechanism coupled to the drain plug includes a push solenoid and a pull solenoid mechanically coupled to said control lever.

* * * * *